(12) United States Patent
Wang et al.

(10) Patent No.: US 11,334,276 B2
(45) Date of Patent: May 17, 2022

(54) USING SEGMENT PRE-ALLOCATION TO SUPPORT LARGE SEGMENTS

(71) Applicant: VMware, Inc., Palo Alto, CA (US)

(72) Inventors: Wenguang Wang, Santa Clara, CA (US); Vamsi Gunturu, Cupertino, CA (US)

(73) Assignee: VMWARE INC., Palo Alto, CA (US)

(*) Notice: Subject to any disclaimer, the term of this patent is extended or adjusted under 35 U.S.C. 154(b) by 206 days.

(21) Appl. No.: 16/842,635

(22) Filed: Apr. 7, 2020

(65) Prior Publication Data

US 2021/0311652 A1 Oct. 7, 2021

(51) Int. Cl.
*G06F 3/06* (2006.01)

(52) U.S. Cl.
CPC ............ *G06F 3/0652* (2013.01); *G06F 3/061* (2013.01); *G06F 3/064* (2013.01); *G06F 3/067* (2013.01); *G06F 3/0631* (2013.01); *G06F 3/0653* (2013.01); *G06F 3/0659* (2013.01); *G06F 3/0665* (2013.01); *G06F 3/0689* (2013.01); *G06F 2211/104* (2013.01)

(58) Field of Classification Search
CPC ...... G06F 3/061; G06F 3/0614; G06F 3/0631; G06F 3/064; G06F 3/0643; G06F 3/0652; G06F 3/0653; G06F 3/0659; G06F 3/0665; G06F 3/067; G06F 3/0685; G06F 3/0689
See application file for complete search history.

(56) References Cited

U.S. PATENT DOCUMENTS

| | | | | |
|---|---|---|---|---|
| 5,371,519 | A * | 12/1994 | Fisher | G09G 5/00 345/536 |
| 6,223,301 | B1 * | 4/2001 | Santeler | G06F 11/1044 714/6.2 |
| 6,349,312 | B1 * | 2/2002 | Fresko | G06F 12/023 |
| 9,697,219 | B1 * | 7/2017 | Wang | G06F 3/0619 |
| 9,841,908 | B1 * | 12/2017 | Zhao | G06F 11/1469 |
| 11,061,594 | B1 * | 7/2021 | Wang | G06F 3/064 |
| 2007/0192544 | A1 * | 8/2007 | Frolund | G06F 11/183 711/135 |
| 2007/0208839 | A1 * | 9/2007 | Voigt | G06F 12/0253 709/223 |
| 2009/0157955 | A1 * | 6/2009 | Karstens | G06F 3/0631 711/112 |
| 2014/0208083 | A1 * | 7/2014 | Burnett | G06F 9/38 712/228 |
| 2014/0279929 | A1 * | 9/2014 | Gupta | G06F 11/1451 707/683 |

(Continued)

*Primary Examiner* — Larry T Mackall

(57) ABSTRACT

Techniques for supporting large segments when issuing writes to an erasure coded storage object in a distributed storage system are provided. In one set of embodiments, a node of the system can pre-allocate a segment of space in a capacity object of the storage object, receive a write request for updating a logical data block of the storage object, write data/metadata for the block to a record in a data log of a metadata object of the storage object, place the block in an in-memory bank, and determine whether the in-memory bank has become full. If so, the node can compute/fill-in one or more parity blocks for each stripe of the storage object in the in-memory bank and write, based on a next sub-segment pointer pointing to a free sub-segment of the pre-allocated segment, the contents of the in-memory bank via a full stripe write to the free sub-segment.

21 Claims, 8 Drawing Sheets

(56) References Cited

U.S. PATENT DOCUMENTS

| | | | |
|---|---|---|---|
| 2014/0279931 A1* | 9/2014 | Gupta | G06F 16/27 |
| | | | 707/683 |
| 2015/0242311 A1* | 8/2015 | Bulkowski | G06F 16/95 |
| | | | 711/103 |
| 2016/0077746 A1* | 3/2016 | Muth | G06F 3/0608 |
| | | | 711/159 |
| 2019/0065310 A1* | 2/2019 | Rozas | H03M 13/154 |
| 2019/0236002 A1* | 8/2019 | Chawla | G06F 3/067 |

* cited by examiner

USING SEGMENT PRE-ALLOCATION TO SUPPORT LARGE SEGMENTS

CROSS-REFERENCES TO RELATED APPLICATIONS

The present application is related to the following commonly-owned U.S. patent applications, filed concurrently herewith:

1. U.S. patent application Ser. No. 16/842,649 entitled "Issuing Efficient Writes to Erasure Coded Objects in a Distributed Storage System with Two Tiers of Storage";
2. U.S. patent application Ser. No. 16/842,657 entitled "Techniques for Reducing Data Log Recovery Time and Metadata Write Amplification"; and
3. U.S. patent application Ser. No. 16/842,604, now U.S. Pat. No. 11,226,760, entitled "Using Data Rebuilding to Support Large Segments."

The entire contents of the foregoing applications are incorporated herein by reference for all purposes.

BACKGROUND

In a distributed storage system, data is stored across a number of servers, referred to as nodes, that each includes a set of physical storage resources (e.g., solid state disks (SSDs), magnetic disks, etc.). The distributed storage system aggregates the per-node physical storage resources into a logical storage pool and makes this logical storage pool available to various clients (e.g., applications, virtual machines (VMs), etc.) for carrying out storage operations.

To provide fault tolerance in the face of node failures, a distributed storage system typically employs one of two data redundancy schemes: mirroring or erasure coding. Mirroring is commonly implemented via RAID (Redundant Array of Independent Disks) level 1 (RAID-1) and involves writing data blocks in an identical manner to two or more nodes of the system. Because each node in a mirrored group maintains an identical copy of the data, if one or more nodes in the group fail the remaining live node(s) can be used for data recovery.

Erasure coding is commonly implemented via RAID level 5 (RAID-5) or RAID level 6 (RAID-6) and involves striping data blocks across nodes, along with parity information that is calculated for each stripe of data blocks. Using this parity information, the system can reconstruct one (in the case of RAID-5) or two (in the case of RAID-6) missing data blocks per stripe, thereby enabling the system to withstand one or two node failures.

Mirroring requires significantly more storage overhead than erasure coding to achieve an equivalent level of fault tolerance, and thus erasure coding is generally preferred for large-scale distributed storage systems. However, a drawback of erasure coding is that the efficiency of executing write operations depends on whether the writes are directed to a partial stripe (i.e., a subset of data blocks within a stripe) or to a full stripe (i.e., all of the data blocks within a stripe). For example, in a distributed storage system that implements 4+2 RAID-6 (i.e., RAID-6 with 4 data blocks and two parity blocks per stripe), a write that modifies a single data block of a stripe requires a "read-modify-write" sequence that comprises three data block reads and three data block writes, resulting in a write amplification factor of 3. In contrast, a write that modifies all four data blocks of a stripe (in other words, the full stripe) requires zero data block reads and six data block writes, resulting in a write amplification factor of only 1.5.

One known approach for avoiding the performance impact of executing partial stripe writes comprises using a large amount of NVRAM (non-volatile random access memory) to cache such partial stripe writes until full stripe writes can be formed and issued to the physical storage layer. Another known approach comprises using a log-structured file system (LFS) to organize the storage in a manner that allows writes to any logical block addresses to be coalesced and issued as full stripe writes. The problem with the first approach is that NVRAM is expensive and thus many commodity servers are not equipped with sufficient NVRAM to use this approach. The problem with the second approach is that employing a LFS for coalescing partial stripe writes into full stripe writes is difficult to implement, largely because file system metadata will also be written to disk in a log-structured manner and thus must be appropriately managed.

DETAILED DESCRIPTION

Figure 1:
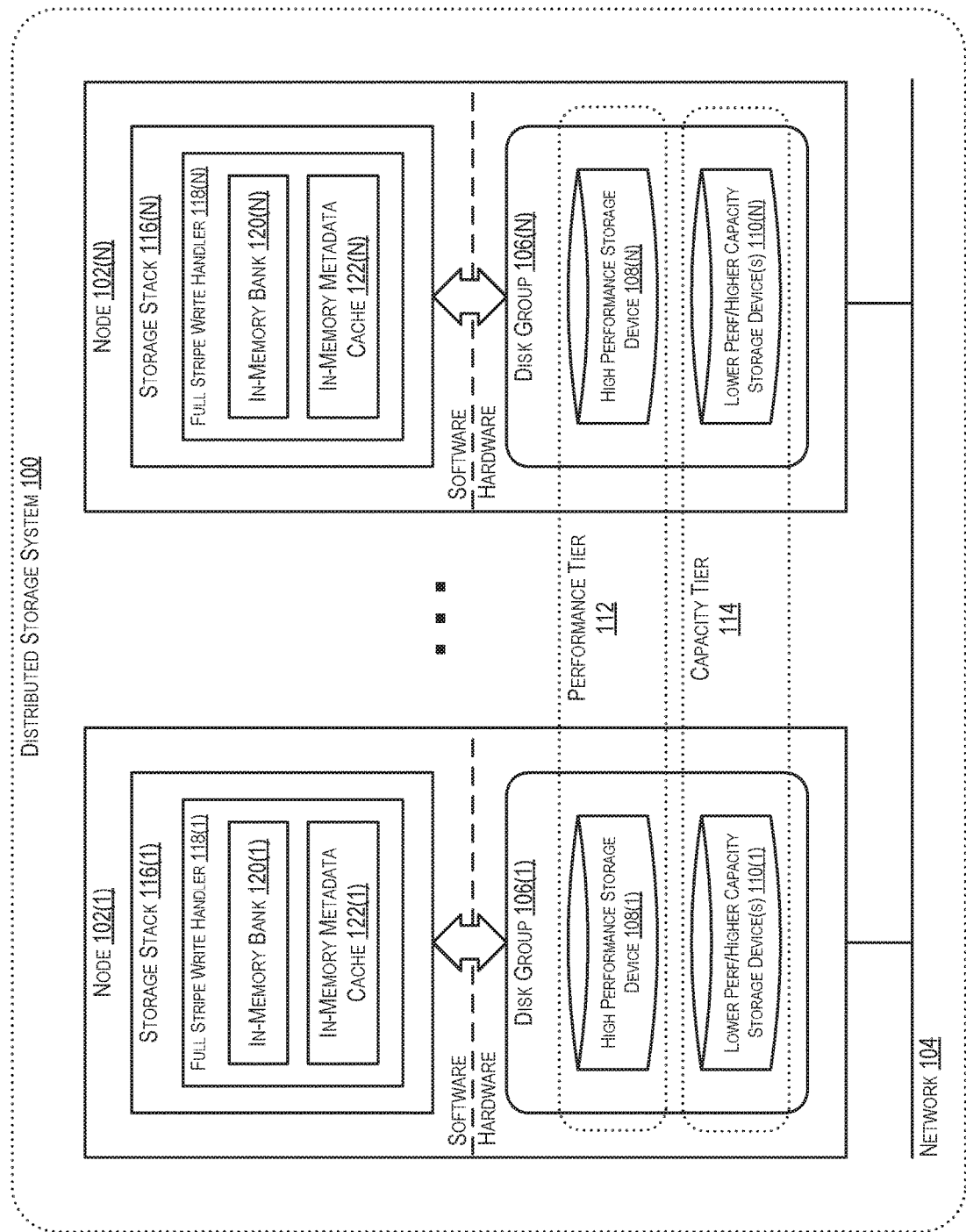
FIG. 1 depicts a distributed storage system according to certain embodiments.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for issuing efficient writes to erasure coded storage objects—in other words, storage objects that are protected via an erasure coding scheme such as RAID-5 or RAID-6—in a distributed storage system. These techniques assume that the distributed storage system employs two tiers of physical storage at each node: a "performance tier" that comprises a storage device with high read/write performance (e.g., a NVMe/PMEM/SLC-based SSD) and a "capacity tier" that comprises one or more storage devices with lower read/write performance, but significantly greater storage capacity, than the performance tier (e.g., one or more QLC-based SDDs or magnetic disks).

Generally speaking, the techniques of the present disclosure involve creating two types of objects on disk for each erasure coded storage object to be maintained by the distributed storage system: a "capacity object" that is configured to hold the data of the storage object and a "metadata object" that is configured to hold the metadata (e.g., recovery log, logical block address to physical block address mappings, etc.) of the storage object. The capacity object is stored on the capacity tier of the distributed storage system using an erasure coding scheme (e.g., RAID-5 or RAID-6) and is managed using a LFS disk layout, while the metadata object is stored on the performance tier of the distributed storage system using a mirroring scheme (e.g., RAID-1) and is managed using a traditional, overwrite-based file system disk layout.

With the configuration above, write commands that are directed to partial stripes of the storage object can be coalesced and issued as full stripe writes to its corresponding capacity object on the capacity tier (due to the capacity object's LFS disk layout), thereby avoiding the excessive write amplification generated by partial stripe writes. At the same time, the metadata for the storage object can be written to its corresponding metadata object on the performance tier using traditional overwrite-based, rather than log-structured, file system semantics, thereby avoiding the complexities of managing the metadata using an LFS. These and other aspects of the present disclosure are described in further detail in the sections that follow.

2. RAID-6 Data Layout and Write Types

To provide context for the embodiments presented herein, Table 1 below illustrates how the data for an example storage object protected via 4+2 RAID-6 may be laid out across the nodes of a conventional distributed storage system. As used herein, a "storage object" is a file, a logical disk, or any other logical grouping of data understood by the distributed storage system. Six nodes N1, N2, N3, N4, N5, and N6 are depicted because each node is assumed to be a separate RAID fault domain and 4+2 RAID-6 requires a total of six fault domains: four for holding data and two for holding parity information.

TABLE 1

Data layout for an example storage object protected via 4 + 2 RAID-6

| Node N1 | Node N2 | Node N3 | Node N4 | Node N5 | Node N6 |
|---------|---------|---------|---------|---------|---------|
| L0 | L1024 | L2048 | L3072 | $P_1$ | $Q_1$ |
| L1 | L1025 | L2049 | L3073 | $P_2$ | $Q_2$ |
| L2 | L1026 | L2050 | L3074 | $P_3$ | $Q_3$ |
| ... | ... | ... | ... | ... | ... |
| L1023 | L2047 | L3071 | L4095 | $P_{1024}$ | $Q_{1024}$ |

As shown above, the data blocks of the storage object (which have logical block addresses (LBAs) ranging from L0 to L4095) are stored in corresponding cells/slots of nodes N1, N2, N3, and N4, where each cell/slot can be understood as representing a physical block address (PBA) on the storage of its respective node. In certain embodiments, these cells/slots may actually be logical offsets within the address space of a storage-level virtual volume (e.g., LUN) spanning nodes N1-N6.

In addition, for each row X of cells/slots in Table 1 (referred to as a "stripe"), node N5 maintains a first parity block $P_X$ which is computed over the data blocks in that stripe using a first parity function and node N6 maintains a second parity block $Q_X$ which is computed over the data blocks in that stripe using a second parity function. With these parity blocks, the distributed storage system can reconstruct up to two missing data blocks per stripe in accordance with standard RAID-6 functionality, thereby enabling the system to tolerate up to two concurrent node failures for the storage object. For example, if nodes N1 and N2 go offline, the system can reconstruct data blocks L0 and L1024 in the first stripe using available data/parity blocks L2048, L3072, $P_1$, and $Q_1$, reconstruct data blocks L1 and L1025 in the second stripe using available data/parity blocks L2049, L3073, $P_2$, and $Q_2$, and so on. It should be noted that although all parity blocks $P_X$ and $Q_X$ in Table 1 are grouped together on nodes N5 and N6 for purposes of illustration, in some embodiments these parity blocks may be rotated across nodes N1-N6 in a round-robin fashion. This parity block rotation prevents any single node from becoming a bottleneck at the time of writing parity blocks to disk.

As mentioned in the Background section, one drawback with erasure coding schemes such as RAID-6 is that, due to the need to compute and maintain parity information, the way in which write operations are executed will vary depending on the number of data blocks being written. This, in turn, can lead to poor write efficiency and performance in certain scenarios. There are generally three types of writes that can be issued with respect to an erasure coded storage object:

1. Small partial stripe—this type of write operation modifies a single data block in a stripe of the storage object. When a small partial stripe write is issued, the distributed storage system will execute a "read-modify-write" sequence that involves reading the existing data of the modified data block, reading the parity block(s) of the stripe to which that data block belongs, re-calculating the parity block(s), and writing the modified data block and re-calculated parity block(s) to disk.
2. Large partial stripe—this type of write operation modifies more than one, but less than all, of the data blocks in a stripe of the storage object. When a large partial stripe write is issued, the distributed storage system will execute a "reconstruct write" sequence that involves reading the data of the unmodified data blocks in the stripe, reading the parity block(s), re-calculating the parity block(s), and writing the modified data blocks and the re-calculated parity block(s) to disk.
3. Full stripe—this type of write operation modifies all of the data blocks in a stripe of the storage object. When a full stripe write is issued, the distributed storage system will recalculate the parity block(s) of the stripe based on the modified data blocks included in the write operation and write the modified data blocks and the re-calculated parity block(s) to disk.

Table 2 below presents various examples of the foregoing write types in the context of the 4+2 RAID-6 storage object of Table 1, along with the number of reads and writes and degree of write amplification caused by each write operation (where "write amplification" refers to the number of resulting data block writes divided by the number of data block writes specified in the command):

TABLE 2

Example writes issued to the storage object of Table 1 and resulting performance

| Data Blocks to Write | Write Type | Resulting Data Block Reads | Resulting Data Block Writes | Write Amplification |
|---|---|---|---|---|
| L0 | Small partial stripe | L0, $P_1$, $Q_1$ | L0, $P_1$, $Q_1$ | 3 |
| L0, L1024 | Large partial stripe | L2048, L3072 | L0, L1024, $P_1$, $Q_1$ | 2 |
| L0, L1024, L2048 | Large partial stripe | L3072 | L0, L1024, L2048, $P_1$, $Q_1$ | 1.67 |
| L0, L1024, L2048, L3072 | Full stripe | None | L0, L1024, L2048, L3072, $P_1$, $Q_1$ | 1.5 |

As can be seen in Table 2, full stripe writes are the most efficient type of write operation because they result in zero reads and a relatively low write amplification factor of 1.5 (i.e., 6 resulting data block writes/4 data blocks to write). In contrast, small and large partial stripe writes are less efficient, with small partial writes resulting in three reads and a write amplification factor of 3 (i.e., 3 resulting data block writes/1 data block to write), which is double the write amplification of full stripe writes. Accordingly, to optimize write performance, it is preferable to avoid issuing any small or large partial stripe writes and instead issue only full stripe writes.

One way to achieve this is to employ an NVRAM for caching partial stripe writes until a full stripe write can be formed and issued to the physical storage layer. For example, assume a storage client submits a request to update data blocks L0 and L2048 of the storage object of Table 1. In this scenario, the distributed storage system can cache the write request in NVRAM until additional write requests are received to update the remaining data blocks in that same stripe (i.e., L1024 and L3072). Once such additional write requests are received, the system can generate and issue a full stripe write for updating the entire stripe <L0, L1024, L2048, L3072> at once.

However, the problems with this approach are twofold: first, it requires a relatively large pool of NVRAM per storage node (because write requests may need to be cached for a long period of time), which is expensive. Second, there is no guarantee that the additional write requests needed to form a full stripe write will ever be received. For instance, in the example above the storage client may never submit subsequent write request(s) to update blocks L1024 and L3072, which means that the system must proceed at some point with a partial stripe write of blocks L0 and L2048.

Another way to mitigate/avoid the performance impact of executing partial stripe writes is to manage the distributed storage system's storage pool using a log-structured file system (LFS). As known in the art, an LFS is a file system in which logical data blocks are not overwritten in place on disk; instead, each time a write is made to a logical data block of a storage object, a brand new physical data block is allocated and written with the latest version of that logical data block's content, in a sequential log format. Any physical data blocks representing earlier versions of the logical data block are ultimately garbage collected and reused. This is in contrast to "overwrite-based" file systems where each logical data block of a storage object is mapped to a single physical block address (PBA) and any modifications to that logical data block are written/overwritten at its mapped PBA.

By employing an LFS, a distributed storage system can coalesce partial stripe writes that are directed to any LBAs of a storage object into a full stripe write, because there is no requirement to maintain those logical data blocks at specific physical locations on disk. For example, with respect to the storage object of Table 1, assume a storage client submits a first write request to modify block L0, a second write request to modify block L223, a third write request to modify block L1026, and a fourth write request to modify block L1027. In this scenario, if the storage object is managed using an LFS disk layout, the system can immediately coalesce these four small partial stripes into a full stripe <L0, L223, L1026, L1027> and persist this as a brand new stripe across nodes N1-N6 (along with the appropriate parity blocks). Thus, this approach avoids the need to wait for full stripes to be formed in accordance with a fixed set of LBA to PBA mappings per the first approach above.

The main problem with employing an LFS to construct and issue full stripe writes for an erasure coded storage object is that the metadata for the storage object will also be persisted in a log-structured manner, such that any changes to the metadata will cause it to change location on disk (via the allocation of new physical blocks). This requires a management mechanism to keep track of the constantly shifting locations of the object's metadata, which significantly increases the complexity of the system.

3. Solution Architecture

To address the foregoing and other similar issues, FIG. 1 depicts the architecture of a distributed storage system 100 that ensures writes to erasure coded storage objects will always be issued as full stripe writes, without requiring a large amount of NVRAM for write caching and without the need to manage storage object metadata using an LFS. As shown, distributed storage system 100 comprises a number of nodes 102(1)-(N) that are interconnected via a network 104. Each node 102 includes a set of physical storage resources, referred to as a disk group 106, that comprises two distinct classes of storage devices: a relatively small capacity, high performance storage device 108 (e.g., a NVMe/PMEM/SLC-based SSD) and one or more lower performance (and lower cost), but higher capacity, storage devices 110 (e.g., QLC-based SSDs or magnetic disks). High performance storage devices 108(1)-(N) collectively represent a performance storage tier 112 of system 100 and lower performance/higher capacity storage devices 110(1)-(N) collectively represent a capacity storage tier 114 of system 100.

In addition, each node 102 includes a storage stack 116 comprising a novel full stripe write handler 118. Storage stacks 116(1)-(N) and full stripe write handlers 118(1)-(N) may be implemented in software, in hardware, or a combination thereof. In various embodiments, it is assumed that each storage stack 116 is responsible for coordinating/handling the I/O for a disjoint subset of the storage objects maintained by distributed storage system 100. For example, storage stack 116(1) of node 102(1) may be responsible for coordinating/handling read and write requests directed to a first subset of storage objects O1-O1000, storage stack 116(2) of node 102(2) may be responsible for coordinating/handling read and write requests directed to a second subset of storage objects O1001-O2000, and so on.

At a high level, each time an erasure coded (e.g., RAID-5 or RAID-6) storage object O is provisioned on distributed storage system 100, two objects representing storage object O can be created on disk: a small metadata object MetaObjO on performance tier 112 that is configured to hold the metadata of O and a larger capacity object CapObjO on capacity tier 114 that is configured to hold the data of O. Capacity object CapObjO is created/managed using a LFS disk layout and is striped across some, or all, of storage devices 110(1)-(N) of capacity tier 114 in accordance with O's provisioned erasure coding scheme. Metadata object MetaObjO is created/managed using a traditional, overwrite-based file system disk layout and is mirrored (via, e.g., RAID-1) across some, or all, of storage devices 108(1)-(N) on performance tier 112 to a degree that allows MetaObjO to match the fault tolerance level of CapObjO.

Figure 2:
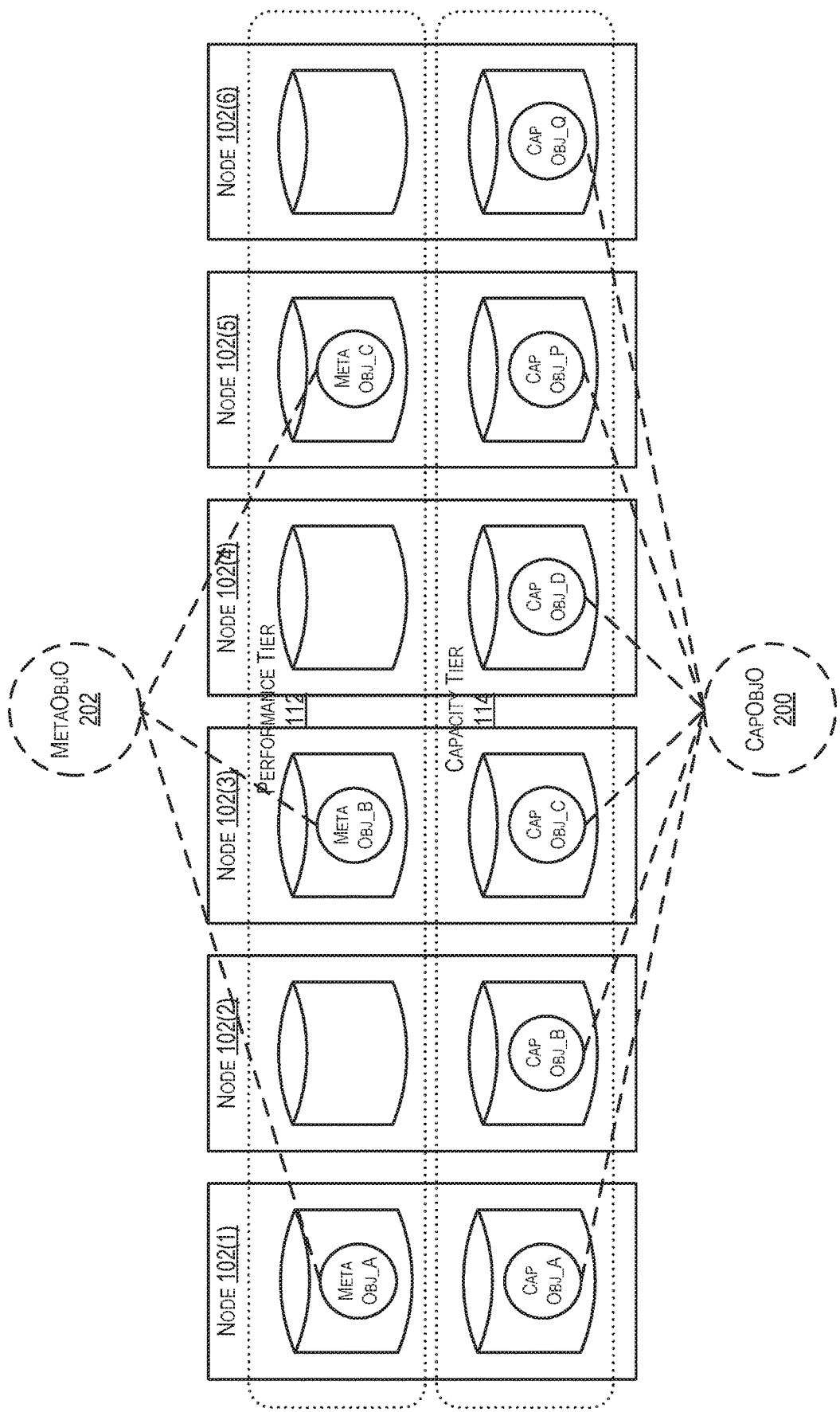
FIG. 2 depicts an example layout for an erasure coded storage object on the distributed storage system of FIG. 1 according to certain embodiments.

By way of example, FIG. 2 depicts an example scenario in which storage object O is protected using 4+2 RAID-6. Accordingly, O's CapObjO (reference numeral 200) is striped via six RAID-6 components CapObj_A, CapObj_B, CapObj_C, CapObj_D, CapObj_P, and CapObj_Q across nodes 102(1)-(6) of capacity tier 114. In addition, O's MetaObjO (reference numeral 202) is mirrored via three RAID-1 components MetaObj_A, MetObj_B, and MetaObj_C across nodes 102(1), 102(3), and 102(5) of performance tier 112, thereby achieving the same level of fault tolerance as CapObjO (i.e., tolerance against two concurrent node failures).

Figure 3:
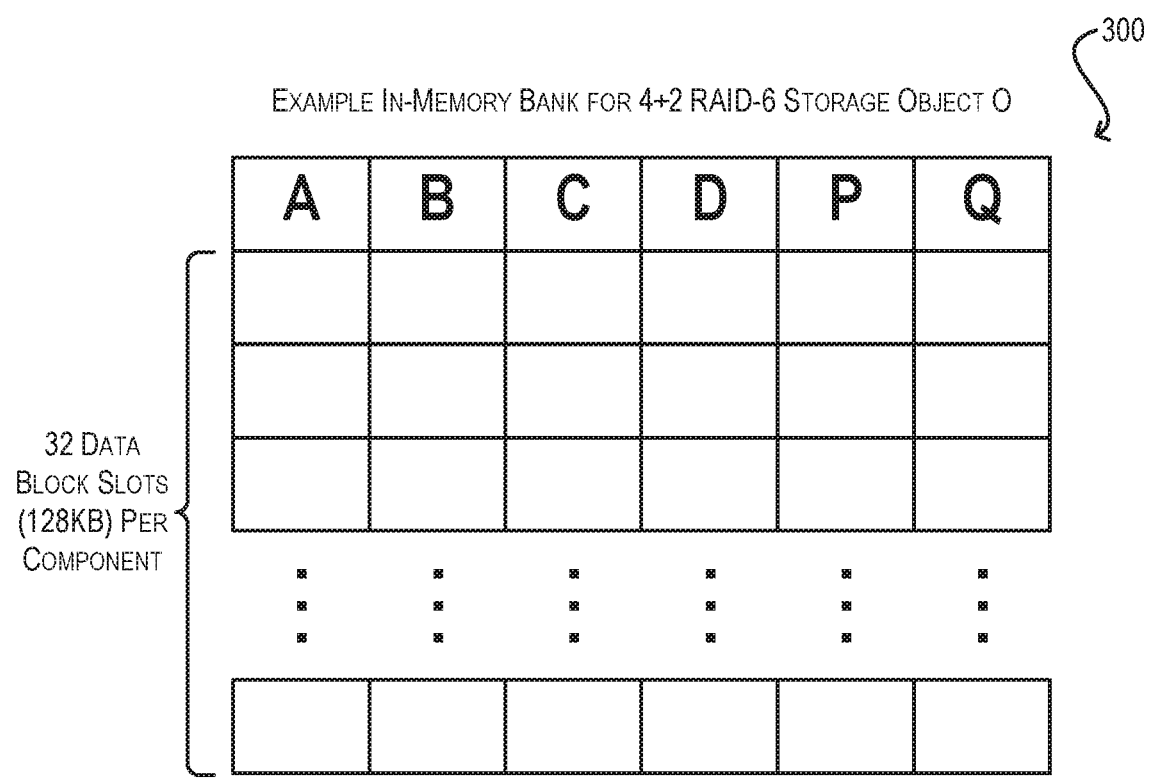
FIG. 3 depicts an example in-memory bank according to certain embodiments.

With the metadata and capacity objects of storage object O in place, when a client of distributed storage system 100 submits a write request for modifying a logical data block B of O, full stripe write handler 118 of the storage stack that owns (i.e., is responsible for handling) O can execute a write processing workflow comprising, inter alia, (1) logging the write request in a data log region of MetaObjO, (2) caching the write request in an in-memory bank 120, and (3) caching certain metadata of O that is modified due to the write request (e.g., the LBA-to-PBA mapping for block B, segment usage table (SUT) information, etc.) in an in-memory metadata cache 122. In various embodiments, in-memory bank 120 is sized to hold an amount of write data equivalent to a predefined number of stripes of storage object O that will be written as a full stripe write to O's capacity object CapObjO. For example, FIG. 3 depicts an example in-memory bank 300 for storage object O in the scenario of FIG. 2 where CapObjO is striped across six components/nodes of distributed storage system 100 via 4+2 RAID-6. As shown in FIG. 3, in-memory bank 300 includes six columns A, B, C, D, P, and Q corresponding to O's RAID-6 components CapObj_A, CapObj_B, CapObj_C, CapObj_D, CapObj_P, and CapObj_Q and 32 data block slots per column, resulting in a total capacity of 32 full stripes and 32×6=192 data blocks. Assuming the size of each data block is 4 KB, this means that in-memory bank 300 of FIG. 3 can hold 128 KB per component and 768 KB in total.

Upon completing steps (1)-(3), full stripe write handler 118 can check whether its in-memory bank 120 has become full (i.e., there are no empty slots in bank 120 for holding further write data). If so, full stripe write handler 118 can write out the entirety of in-memory bank 120 via a full stripe write to an available segment of CapObjO on capacity tier 114, where a "segment" is a region of space in the LFS disk layout of CapObjO that can hold the contents of the bank. On the other hand, if in-memory bank 120 still contains one or more empty slot(s), full stripe write handler 118 can continue caching write data directed to storage object O in bank 120 until the bank becomes full and can be written to CapObjO via a full stripe write.

Finally, on a periodic basis, the data log portion of MetaObjO can be checkpointed and truncated (which, in certain embodiments, can involve flushing the dirty metadata for storage object O in in-memory metadata cache 122 to MetaObjO), and old segments of CapObjO that no longer hold any live logical data blocks can be garbage collected per LFS semantics (thereby allowing those segments to be reused for writing new data to CapObjO).

With the general architecture and approach described above, a number of benefits are achieved. First, as indicated previously, distributed storage system 100 can ensure that writes to the system's erasure coded storage objects are always issued as full stripe writes, rather than partial stripe writes. Accordingly, this architecture and approach effectively eliminates the read traffic and excessive write amplification generated by such partial stripe writes, resulting in improved write efficiency and performance.

Second, because the metadata for each storage object O is maintained in a separate metadata object MetaObjO that is managed via an overwrite-based file system (rather than an LFS) disk layout on performance tier 122, there is no need to implement a complicated mechanism to track the movement of object metadata each time it is written, thus reducing the complexity of the system. Although there is a certain amount of performance overhead involved in updating and managing the metadata for each storage object separately via its corresponding metadata object, the degree of this overhead will generally be small in practice due to the high I/O throughput and low I/O latency of performance tier 112 and the small size of the metadata object relative to the capacity object.

The remaining sections of this disclosure provide additional details regarding the various workflows that may be performed by full stripe write handlers 118(1)-(N)/storage stacks 116(1)-(N) (e.g., processing write requests, checkpointing/truncating the data log in MetaObjO, garbage collecting segments of CapObjO, etc.), as well as certain enhancements to the foregoing design. It should be appreciated that FIGS. 1-3 are illustrative and not intended to limit embodiments of the present disclosure. For example, although FIG. 3 depicts an in-memory bank structure that is suited for a storage object that is protected via 4+2 RAID-6, the structure of this bank will vary for other erasure coding schemes (e.g., 3+1 RAID-5, 6+2 RAID-6, etc.). In addition, the size of in-memory bank 300 may be increased or decreased to accommodate the I/O characteristics of the physical storage devices that make up capacity tier 114. The particular bank size depicted in FIG. 3 (i.e., 32 stripes, 128 KB per node, 768 KB total) works well with QLC-based SDDs but may be less efficient for other types of capacity storage hardware.

Further, although FIG. 1 shows that each full stripe write handler 118 includes a single in-memory bank and a single in-memory metadata cache for simplicity of illustration, in practice each handler 118 will typically maintain an in-memory bank and in-memory metadata cache for each storage object being processed by that handler. In some embodiments, each full stripe write hander 118 may maintain two in-memory banks per storage object so that the handler can easily switch from one bank to another when the first bank becomes full (and thus can continue processing incoming write requests while the full bank is being written out to capacity tier 114).

Yet further, although FIG. 1 depicts a particular arrangement of components in distributed storage system 100, other arrangements are possible (e.g., the functionality attributed to a particular component may be split into multiple components, components may be combined, parity blocks may not rotate across components, etc.), and each component may have sub-components or implement functions that are not specifically described. One of ordinary skill in the art will recognize other variations, modifications, and alternatives.

4. Processing Write Requests

Figure 4:
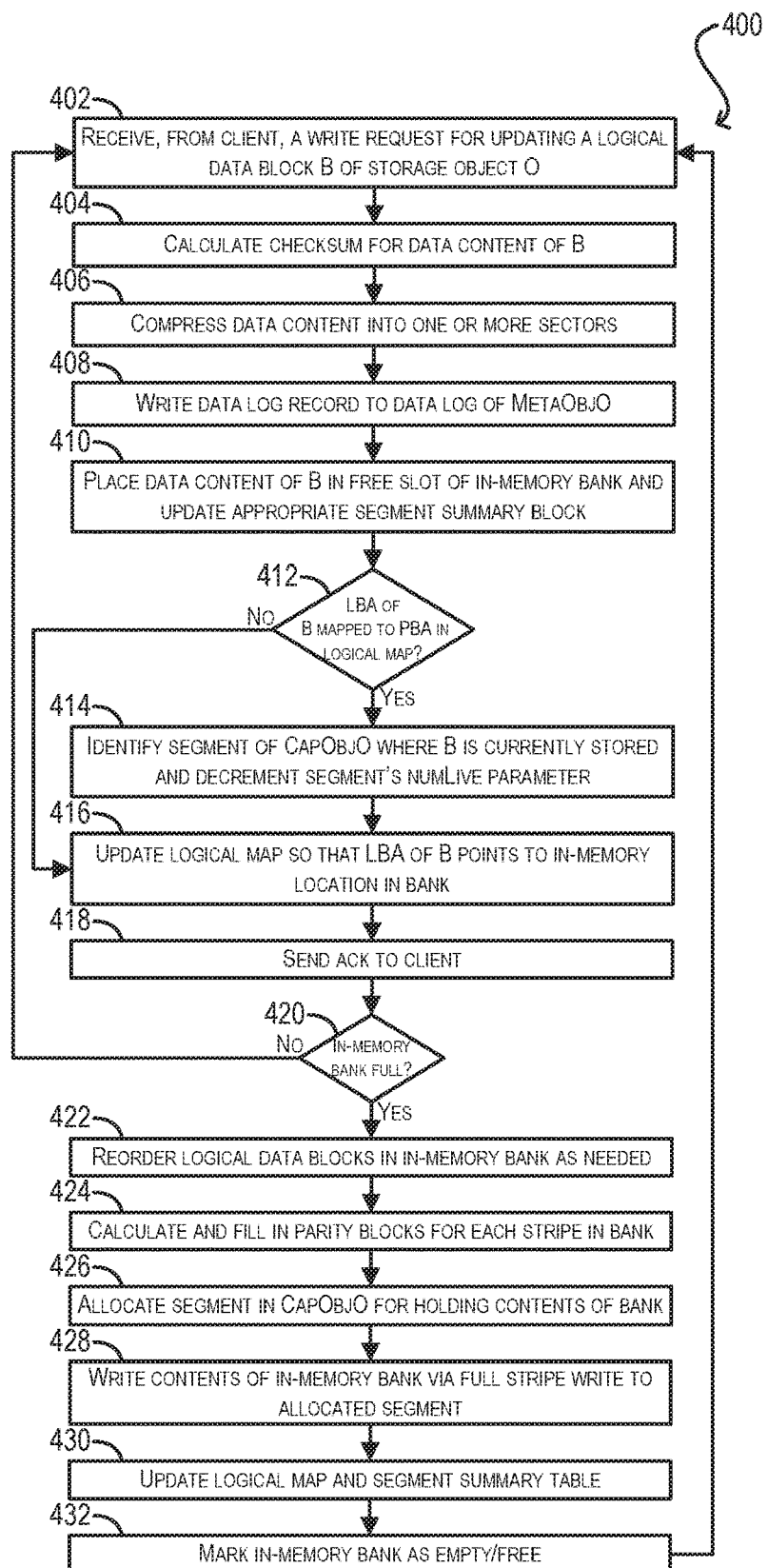
FIG. 4 depicts a first write processing workflow according to certain embodiments.

FIG. 4 depicts a workflow 400 that may be performed by each full stripe write handler 118 of FIG. 1 for processing a write request directed to an erasure coded storage object O owned by that handler according to certain embodiments. Workflow 400 assumes that a mirrored metadata object MetaObjO (formatted as an overwritable disk) has been created for O on performance tier 112 and an erasure coded capacity object CapObjO (formatted as an LFS disk) has been created for O on capacity tier 114 in accordance with the description in the foregoing Solution Architecture section.

Starting with step 402, full stripe write handler 118 can receive from, e.g., a client of distributed storage system 100, a write request for updating a logical data block B of storage object O. In response, full stripe write handler 118 can calculate a checksum for the data content of B (step 404), compress that data content into one or more sectors (step 406), and write a log record to the data log portion of MetaObjO on performance tier 112 that includes B's LBA, B's data content, checksum, and compressed sector size (step 408). The purpose of writing this log record is to maintain a record of the write request on persistent storage (i.e., performance tier 112) so that it can be replayed in case a failure occurs before the data content for B can be propagated to CapObjO on capacity tier 114. In a particular embodiment, the uncompressed size of B is assumed to be 4 KB and the size of each sector is assumed to be 512 B, resulting in a maximum possible compression ratio of 8:1.

Upon writing the log record to the data log of MetaObjO, full stripe write handler 118 can place the data content of B in a free data block slot of in-memory bank 120 associated with storage object O and update a "segment summary block" within bank 120 for the component/node on which B is placed with B's LBA, checksum, and compressed sector size (step 410). For example, if B is placed in the first slot of component A in in-memory bank 300 of FIG. 3, handler 118 can update a segment summary block that is associated with component A. These segment summary blocks are typically located at the bottom of each column of the in-memory bank and will be accessed at the time of garbage collecting segments in CapObjO (described in section (6) below).

Full stripe write handler 118 can further check whether B's LBA is currently mapped to a PBA in a logical map that is cached in in-memory metadata cache 122 for storage object O (step 412). This logical map is configured to hold, for each logical data block of O that has been written to, a mapping between the logical block's LBA and the PBA (within, e.g., a segment of CapObjO) where the latest data for the logical block current resides. If the answer at step 412 is no, full stripe write handler 118 can conclude that the write request received at step 412 is the first write to logical block B (in other words, block B has not been written to before).

However, if the answer at step 412 is yes, full stripe write handler 118 can conclude that a version of B already exists on disk in O's capacity object CapObjO. In this case, full stripe write handler 118 can identify an existing segment of CapObjO on capacity tier 114 where B is currently stored via a segment usage table (SUT) within in-memory metadata cache 122 and decrement a "numLive" parameter for the identified segment in the SUT (step 414). In various embodiments, this SUT is a table that lists all of the segments of CapObjO that have been written to, along with the number of data blocks per segment that have not yet been updated in a subsequent segment and thus rendered "dead" (per the numLive parameter). Like the segment summary blocks mentioned above, the SUT and its per-segment numLive parameters will be accessed later on in order to carry out segment garbage collection for CapObjO.

At step 416, full stripe write handler 118 can update the logical map in in-memory metadata cache 122 such that the LBA of logical block B now points to the slot in in-memory bank 120 where B has been placed. Full stripe write handler 118 can then send an acknowledgment to the client which originated the write request indicating that the write request has been processed (thereby allowing the client to proceed with its operation) (step 418).

Upon sending the acknowledgement, full stripe write handler 118 can check whether in-memory bank 120 is now full (step 420). If the answer is no, handler 118 can return to step 402 in order to process the next incoming write request directed to storage object O.

However, if the answer at step 420 is yes, full stripe write handler 118 can reorder the logical data blocks within in-memory bank 120 if needed, with the goal of placing data blocks with contiguous LBAs in contiguous slots of a single component/node (step 422). For example, with respect to in-memory bank 300 of FIG. 3, if a first logical data block with LBA 10 is initially placed on component A, a second logical data block with LBA 11 is initially placed on component B, and a third logical data block with LBA 12 is initially placed on component C, the reordering process of step 322 can move all three data blocks to contiguous slots on, e.g., component A. This advantageously makes the reading of the three data blocks faster because they can be read in sequence from a single node (rather than requiring three separate reads from three different nodes). As part of step 422, full stripe write handler 118 may move entries between the segment summary blocks of the various components/nodes in in-memory bank 120 to align with the new logical block placements.

Once the data blocks have been reordered, full stripe write handler 118 can calculate and fill in the parity blocks for each stripe of data blocks in in-memory bank 120 (step 424), allocate a new segment in CapObjO for holding the contents of in-memory bank 120 (or find an existing free segment via the SUT) (step 426), and write out in-memory bank 120 via a full stripe write to that segment (step 428). Full stripe write handler 118 can further update the logical map in in-memory metadata cache 122 so that the LBAs of the logical data blocks in the bank/segment now point to the PBAs on capacity tier 114 where the data blocks now reside and update the SUT in in-memory metadata cache 122 to identify the new segment of CapObjO and the number of live data blocks in that segment (step 430).

Finally, at step 432, full stripe write handler 118 can mark in-memory data bank 120 as empty/free and return to step 402 to process the next incoming write request for storage object O. As noted earlier, in some embodiments full stripe write handler 118 may maintain two in-memory banks per storage object; this advantageously allows the handler to process new incoming write requests via the second bank while the first (full) bank is still in the process of being written to CapObjO. After the first bank has been written out, that first bank can subsequently used to process incoming write requests when the second bank becomes full and needs to be written to CapObjO.

5. Checkpointing the Data Log

As noted with respect to step 408 of workflow 400, for each logical block B that is updated in storage object O, full stripe write handler 118 can write a data log record to a data log of MetaObjO on performance tier 112 that includes the data content of B as well metadata such as B's LBA, checksum, and compressed sector size. These records can then be replayed from the data log in the case of a node failure to ensure that the block updates are ultimately persisted to CapObjO on capacity tier 114.

Figure 5:
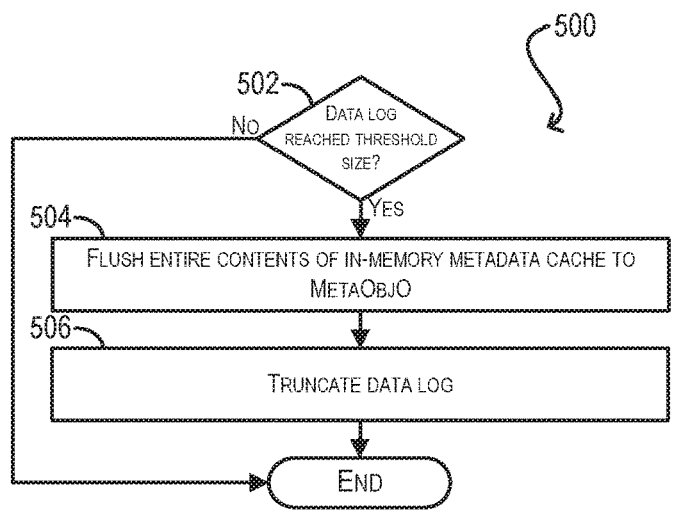
FIG. 5 depicts a first data log checkpointing workflow according to certain embodiments.

Because the data log includes both the data and metadata for each block write to O, the data log should be checkpointed and truncated on a relatively frequent basis in order to prevent the data log from growing too large (which both consumes space on performance tier 112 and slows down the recovery process). FIG. 5 depicts a workflow 500 of this checkpointing mechanism according to certain embodiments. In the description below, it is assumed that workflow 500 is performed on a periodic basis by full stripe write handler 118, potentially concurrently with workflow 400. However, in other embodiments workflow 500 can be performed by a different component of storage stack 116, such as a background checkpointing process.

At step 502, full stripe write handler 118 can first check whether the data log for storage object O in MetaObjO has reached a threshold size. If the answer is no, workflow 500 can end.

However, if the answer at step 502 is yes, full stripe write handler 118 can flush the entire contents of in-memory metadata cache 122 for O (e.g., the logical map and SUT) to MetaObjO (step 504), thereby persisting that metadata to disk. Full stripe write handler 118 can then truncate the data log by removing all of the existing data log records from the data log (because the write requests represented by the truncated log records have been durably stored) (block 506) and terminate the workflow.

6. Garbage Collecting Segments

Figure 6:
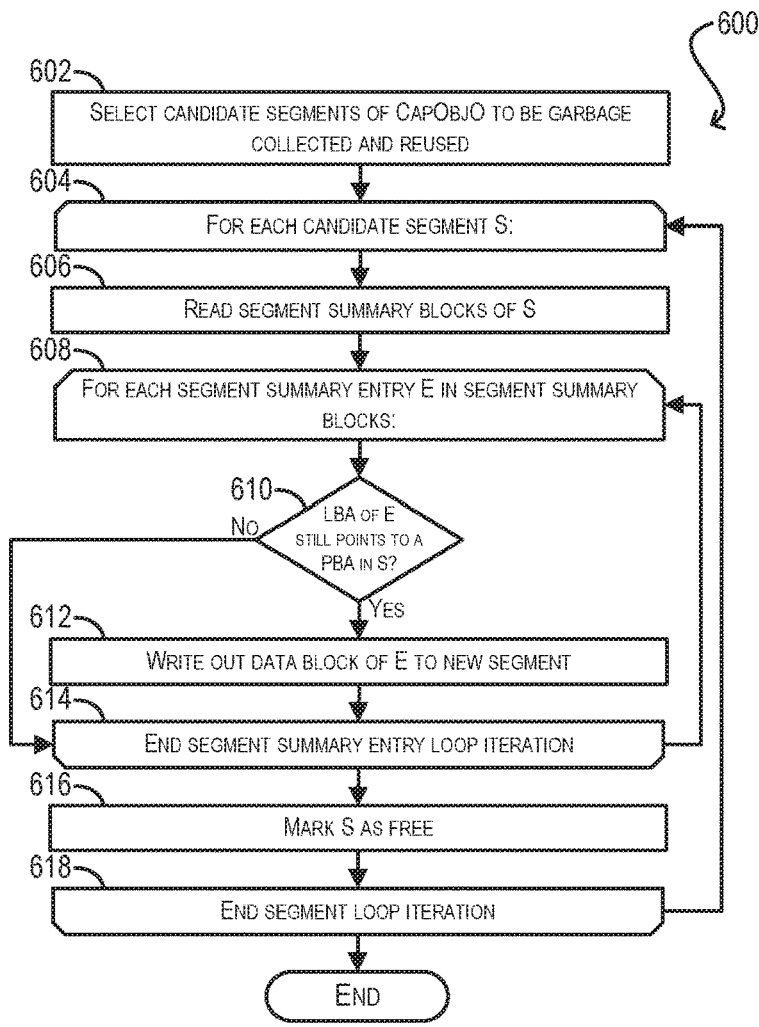
FIG. 6 depicts a segment garbage collection workflow according to certain embodiments.

FIG. 6 depicts a workflow 600 for garbage collecting segments of capacity object CapObjO of storage object O that have been written to (per workflow 400 of FIG. 4) according to certain embodiments. Through this garbage collection process, existing segments of CapObjO that may be fragmented (e.g., contain only a small number of live data blocks) can be freed up and reused by full stripe write handler 118 for writing out new banks of write data directed to storage object O. Like workflow 500, the following description assumes that workflow 600 is performed on a periodic basis by full stripe write handler 118, potentially concurrently with workflow 400. However, in other embodiments workflow 600 can be performed by a different component of storage stack 116, such as a dedicated garbage collection process.

Starting with step 602, full stripe write handler 118 can select a number of candidate segments on the LFS disk layout of CapObjO to be garbage collected and reused. These candidate segments can include, e.g., segments that are older than a certain threshold age and/or or consist mostly of "dead" data blocks (i.e., data blocks that have been written in subsequent segments).

At step 604, full stripe write handler 118 can enter a first loop for each candidate segment S. Within this first loop, full stripe write handler 118 can read the segment summary blocks of segment S from CapObjO (step 606) and enter a second loop for each segment summary entry E in the segment summary blocks (step 608).

Within the second loop, full stripe write handler 118 can check whether the LBA of the logical data block of entry E still points to a PBA in segment S, per the logical map maintained in MetaObjO (step 610). If the answer is no, full stripe write handler 118 can conclude that this data block is dead and thus no action is needed. On the other hand, if the answer at step 610 is yes, full stripe write handler 118 can conclude that this data block is still "live" within S and thus write it out to a new segment (per, e.g., workflow 400 of FIG. 4) (step 612).

Once all of the segment summary entries have been processed (step 614), full stripe write handler 118 can free current segment S so that it can be reused (step 616). This step can involve, e.g., updating the segment summary usage table of storage object O to indicate that S is now free/empty. Finally, once all of the candidate segments have been processed (step 618) workflow 600 can end.

7. Checkpointing the Data Log Without Flushing In-Memory Metadata

As discussed in preceding section (5), it is desirable to checkpoint the data log maintained in MetaObjO of storage object O on a relatively frequent basis in order to keep the data log at a reasonable size and to ensure that the data recovery process does not become too slow. However, with the checkpointing workflow described in section (5) (i.e., workflow 400 of FIG. 4), the entirety of in-memory metadata cache 122 for O is flushed to disk for each data log checkpoint. If the data log is checkpointed often, it is likely that only a small percentage of the metadata in in-memory cache 122 will be dirtied between consecutive checkpoints, which means that writing out the entire contents of the in-memory metadata for every checkpoint will result in a significant amount of write amplification.

Figure 7:
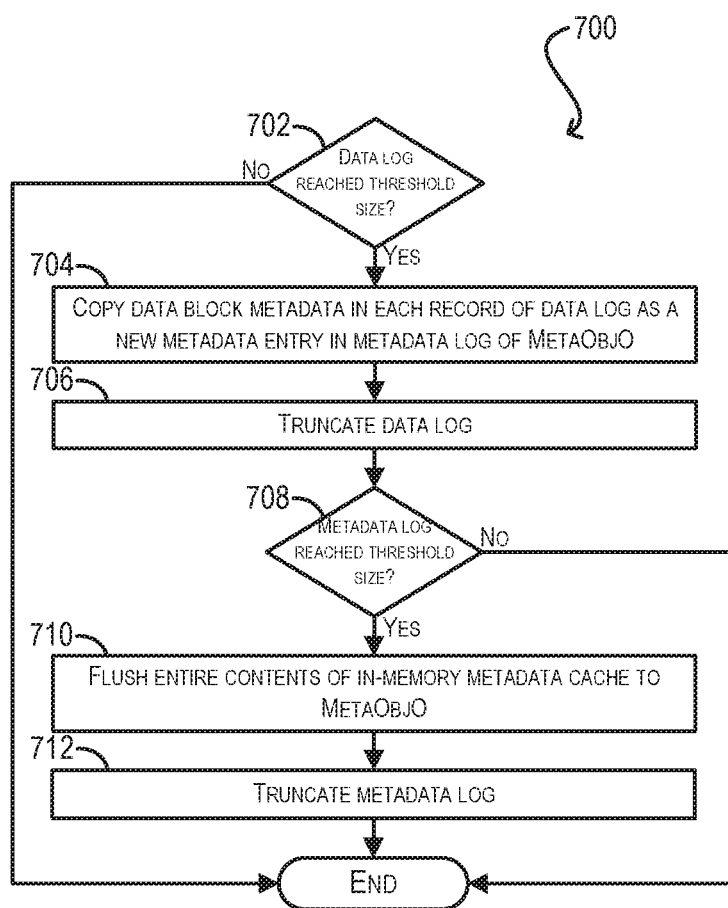
FIG. 7 depicts a second data log checkpointing workflow according to certain embodiments.

To avoid this problem, FIG. 7 depicts an alternative data log checkpointing workflow 700 according to certain embodiments. In alternative workflow 700, an additional "metadata log" (which is separate from the data log) is maintained within MetaObjO of storage object O. At the time of checkpointing the data log, the metadata in the data log records to be checkpointed/truncated are copied over from the data log to the metadata log. This allows the metadata to be persisted on disk for recovery purposes, without having to immediately flush in-memory metadata cache 122 to MetaObjO.

Once the metadata log reaches a threshold size (which will typically occur at intervals that are substantially longer than the data log checkpointing interval), the contents of in-memory metadata cache 122 can be flushed to MetaObjO (note that cache 122 will likely have accumulated a significant amount of dirty metadata at this point, thereby reducing the degree of write amplification caused by the flush). The metadata log can then be truncated and reused. Thus, this approach advantageously enables both (1) frequent checkpointing of the data log (which keeps the size of the data log low and the speed of data recovery fast), and (2) infrequent flushing of in-memory metadata cache 122 (which keeps the write amplification factor of each flush operation low).

Starting with step 702 of workflow 700, full stripe write handler 118 can check whether the data log for storage object O in MetaObjO has reached a threshold size. If the answer is no, workflow 700 can end.

If the answer at step 702 is yes, full stripe write handler 118 can copy the data block metadata (e.g., LBA, checksum, compressed sector size) in each data log record of the data log into a corresponding metadata record in the metadata log (step 704) and truncate the data log by removing those data log records from the data log (step 706). Full stripe write handler 118 can then check whether the metadata log has reached a threshold size (step 708). In certain embodiments, the threshold size for the metadata log may be different from the threshold size for the data log.

If the metadata log has not reached its threshold size at step 708, workflow 700 can end. However, if the metadata log has reached its threshold size at step 708, full stripe write handler 118 can flush the entire contents of in-memory metadata cache 122 for storage object O to MetaObjO on performance tier 112 (step 710). Finally, full stripe write handler 118 can truncate the metadata log by removing all of the records from the metadata log (step 712) and terminate the checkpointing workflow.

8. Supporting Larger Bank/Segment Sizes

The write processing workflow described in section (4) above and depicted in FIG. 4 is generally designed for scenarios where the size of in-memory bank 120 (and thus, the size of each segment in CapObjO of storage object O) is relatively small, such as 768 KB or less. This is because the workflow maintains an instance of bank 120 in system memory for each storage object handled by full write handler 118 and there may be hundreds or thousands of such storage objects at any given point in time.

However, in some scenarios it is desirable to employ a significantly larger bank/segment size than 768 KB. For example, in existing VMware vSAN systems, the minimum space allocation unit is 4 MB. Thus, for these and other similar deployments, it is most efficient to write out 4 MB of data to each component/node per in-memory bank, which translates to a total bank/segment size of 4 MB×6=24 MB for 4+2 RAID-6. But, if each full write handler needs to process, e.g., one thousand storage objects concurrently, this requires 24 GB of system memory per node to be dedicated to in-memory bank space, which is impractical for most systems.

To address this, the following sub-sections present two separate enhancements to write processing workflow 400 of FIG. 4 (referred to as "data rebuilding" and "segment pre-allocation" respectively) that allow for larger bank/segment sizes without requiring an excessive amount of system memory.

8A. Data Rebuilding

With the data rebuilding approach, write requests directed to a given storage object O are written to the data log of O's metadata object MetaObjO, without being immediately placed in an in-memory bank. When a threshold amount of write data has been accumulated in the data log (e.g., 16 MB of data in the case of a 24 MB bank for 4+2 RAID-6), an in-memory bank is allocated and filled with the write data from the accumulated data log records. The filled in-memory bank is then written out as a full stripe write to a segment of O's capacity object CapObjO on capacity tier 114. Thus, this approach avoids the need to maintain space for the in-memory bank for an extended period of time; instead, the bank is allocated on-demand (i.e., when enough write data has been received to fill the bank) and freed shortly thereafter. This, in turn, allows each node 102 of distributed storage system 100 to support larger bank/segment sizes without running out of system memory.

In certain embodiments, the system can maintain a fixed number of in-memory banks per node (e.g., 100 24 MB banks) and cycle through the banks in order to place a strict cap on memory consumption. In these embodiments, if all of the banks are in use at the time a bank needs to be allocated and filled for a given storage object, the flush of the write data for that storage object to capacity tier 114 will be delayed until a bank becomes free. However, new writes to the storage object can continue to be committed to its data log during this time (as long as there is free space in the data log).

Figure 8:
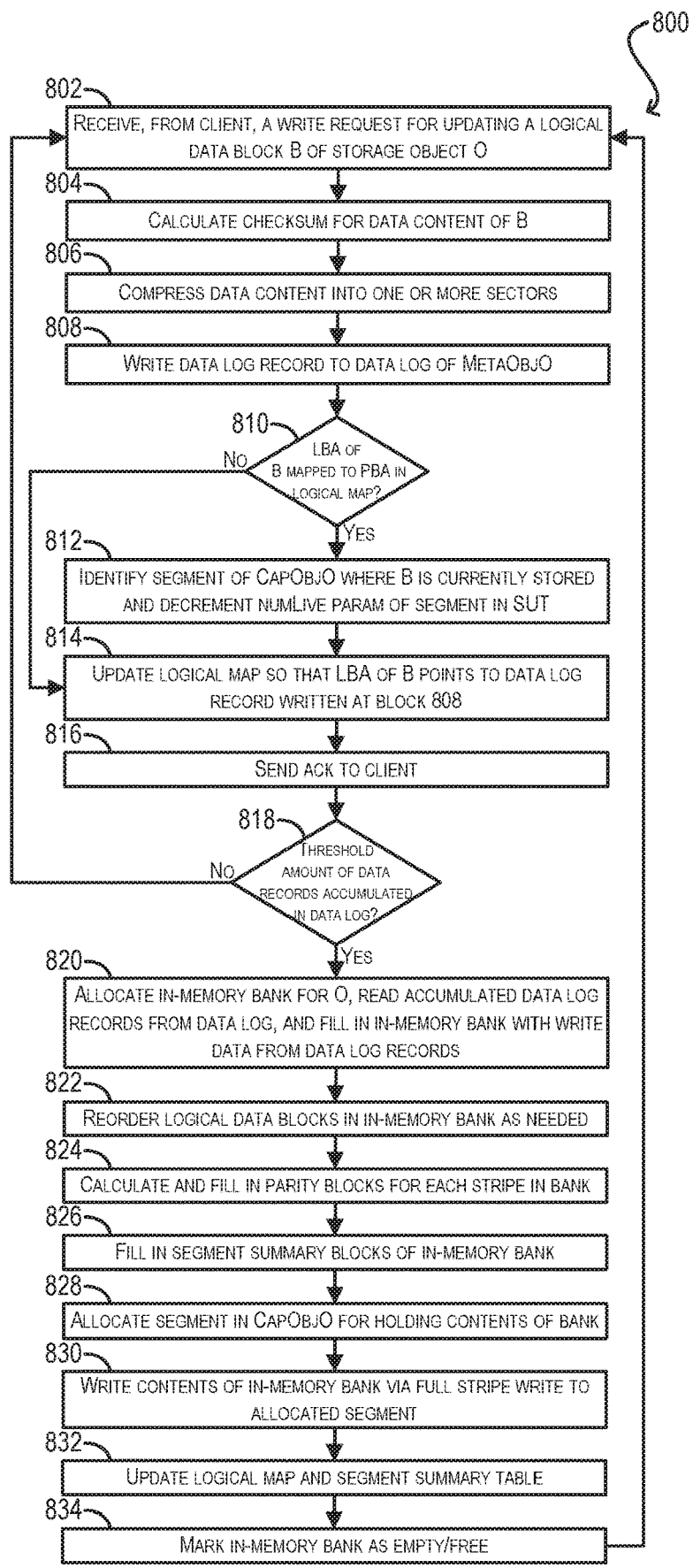
FIG. 8 depicts a second write processing workflow according to certain embodiments.

FIG. 8 depicts a workflow 800 that may be performed by each full stripe write handler 118 of FIG. 1 for processing a write request directed to an erasure coded storage object O owned by that handler using the data rebuilding approach according to certain embodiments. Like workflow 400, workflow 800 assumes that a mirrored metadata object MetaObjO (formatted as an overwritable disk) has been created for O on performance tier 112 and an erasure coded capacity object CapObjO (formatted as an LFS disk) has been created for O on capacity tier 114.

Starting with step 802, full stripe write handler 118 can receive from, e.g., a client of distributed storage system 100, a write request for updating a logical data block B of storage object O. In response, full stripe write handler 118 can calculate a checksum for the data content of B (step 804), compress that data content into one or more sectors (step 806), and write a log record to the data log of MetaObjO that includes B's LBA, data content, checksum, and compressed sector size (step 808).

Upon writing the log record to the data log, full stripe write handler 118 can check whether B's LBA is currently mapped to a PBA in the logical map that is cached in in-memory metadata cache 122 for storage object O (step 810). If the answer is yes, full stripe write handler 118 can identify an existing segment of CapObjO on capacity tier 114 where B is currently stored (via the SUT maintained in in-memory metadata cache 122) and decrement the numLive parameter for the identified segment in the SUT (step 812).

Full stripe write handler 118 can then update the logical map in in-memory metadata cache 122 such that the LBA of logical block B now points to the record in the data log where B has been recorded (step 814) and send an acknowledgment to the client which originated the write request indicating that the request has been processed (thereby allowing the client to proceed with its operation) (step 816).

Upon sending the acknowledgement, full stripe write handler 118 can check whether a threshold amount of data log records has been accumulated in the data log (step 818). This threshold amount will vary depending on the desired size of the in-memory bank for storage object O and O's erasure coding scheme. For example, if the desired bank size is 24 MB and O is erasure coded using 4+2 RAID-6, the threshold amount will be 16 MB. If the answer at step 818 is no, handler 118 can return to the top of the workflow in order to process the next incoming write request directed to storage object O.

However, if the answer at step 818 is yes, full stripe write handler 118 can allocate an in-memory bank 120 for 0, read the data log records from the data log, and fill in in-memory bank 120 will the write data from the data log records (step 820). Full stripe write handler 118 can further reorder the logical data blocks within in-memory bank 120 as needed (step 822), calculate and fill in the parity blocks for each stripe of data blocks (step 824), and fill in the segment summary blocks of in-memory bank 120 (step 826).

At steps 828-832, full stripe write handler 118 can allocate a new segment in CapObjO for holding the contents of in-memory bank 120 (or reuse a free segment), write out in-memory bank 120 via a full stripe write to the new segment, and update the logical map/SUT in in-memory metadata cache 122 accordingly. Finally, at block 834, full stripe write handler 118 can free in-memory data bank 120 and return to step 802 in order to process the next incoming write request for storage object O.

8B. Segment Pre-Allocation

The segment pre-allocation approach is premised on the observation that certain file systems only generate metadata I/O at the time of allocating space on disk (and not on write). Thus, for these file systems, it makes sense to pre-allocate a large segment for CapObjO on capacity tier 114 (e.g., a 24 MB segment), which will generate a metadata write at the time of pre-allocation, and then write out data to CapObjO in smaller "sub-segments" of that large segment (e.g., 768 KB sub-segments), which will not generate any further metadata I/O. This allows for the use of small in-memory banks that correspond to the size of each sub-segment, but avoids the performance hit/write amplification caused by allocating segment space on disk at the time of writing out each in-memory bank to CapObjO.

Figure 9:
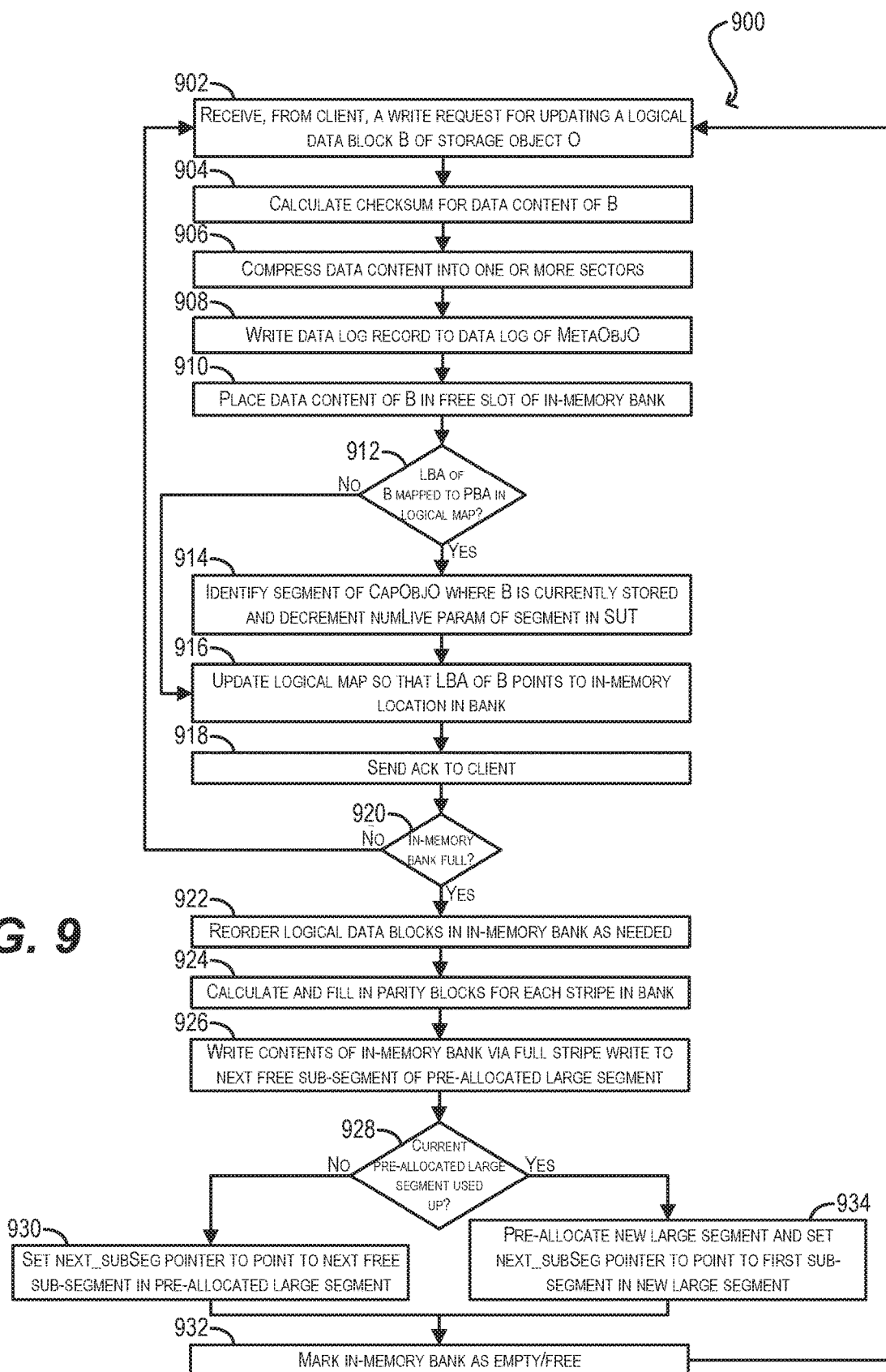
FIG. 9 depicts a third write processing workflow according to certain embodiments.

FIG. 9 depicts a workflow 900 that may be performed by each full stripe write handler 118 of FIG. 1 for processing a write request directed to an erasure coded storage object O owned by that handler using the segment pre-allocation approach according to certain embodiments. Workflow 900 assumes that an initial large segment has been pre-allocated in capacity object CapObjO of O on capacity tier 114 and that in-memory bank 120 for O is sized to be smaller than that segment. For example, in a particular embodiment, the segment size may be 24 MB and the in-memory bank size may be 768 KB. Workflow 900 further assumes that full stripe write handler 118 maintains a pointer (e.g., "next_subSeg") to the next free sub-segment within the current pre-allocated segment.

Starting with step 902, full stripe write handler 118 can receive from, e.g., a client of distributed storage system 100, a write request for updating a logical data block B of storage object O. In response, full stripe write handler 118 can calculate a checksum for the data content of B (step 904), compress that data content into one or more sectors (step 906), and write a log record to the data log portion of MetaObjO on performance tier 112 that includes B's LBA, data content, checksum, and compressed sector size (step 908).

Upon writing the log record to the data log of MetaObjO, full stripe write handler 118 can place the data content of B in a free data block slot of in-memory bank 120 (step 910). Full stripe write handler 112 can further check whether B's LBA is currently mapped to a PBA in the logical map that is cached in in-memory metadata cache 122 for storage object O (step 912). If the answer is yes, full stripe write handler 118 can identify an existing segment of CapObjO on capacity tier 114 where B is currently stored (via the SUT in in-memory metadata cache 122) and decrement the numLive parameter for the identified segment in the SUT (step 914).

Full stripe write handler 118 can then update the logical map in in-memory metadata cache 122 such that the LBA of logical block B now points to the slot in in-memory bank 120 where B has been placed (step 916) and send an acknowledgment to the client which originated the write request indicating that the request has been processed (thereby allowing the client to proceed with its operation) (step 918).

Upon sending the acknowledgement, full stripe write handler 118 can check whether in-memory bank 120 is now full (step 920). If the answer is no, handler 118 can return to the top of the workflow in order to process the next incoming write request directed to storage object O.

However, if the answer at block 920 is yes, full stripe write handler 118 can reorder the logical data blocks within in-memory bank 120 if needed (step 922), calculate and fill-in the parity blocks for each stripe of data blocks (step 924), and write out in-memory bank 120 as a full stripe write to the next free sub-segment of the pre-allocated segment of CapObjO (in accordance with the next_subSeg pointer mentioned earlier) (step 926).

Full stripe write handler 118 can then check whether the entirety of the current pre-allocated segment of CapObjO has been used up (i.e., written to) (step 928). If the answer is no, handler 118 can set the next_subSeg pointer to point to the next free sub-segment within the current segment (step 930), mark in-memory bank 120 as empty/free (step 932), and return to step 902. However, if the answer at step 928 is yes, full stripe write handler 118 can pre-allocate a new large segment in CapObjO and set the next_subSeg pointer to point to the first free sub-segment within that newly-allocated segment (step 934) before proceeding with marking in-memory bank 120 as empty/free and returning to the top of the workflow.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for supporting large segments when issuing writes to an erasure coded storage object in a distributed storage system, the method comprising:
   pre-allocating, by a node of the distributed storage system, a segment of space in a capacity object of the storage object, the capacity object being maintained on a first storage tier of the distributed storage system comprising a first set of one or more storage devices;
   receiving, by the node, a write request for updating a logical block of the storage object;
   writing, by the node, data and metadata for the logical data block to a data log record in a data log of a metadata object of the storage object, the metadata object being maintained on a second storage tier of the distributed storage system comprising a second set of one or more storage devices, the second storage tier having higher I/O performance but lower storage capacity than the first storage tier;
   placing, by the node, the data for the logical data block in a free slot of an in-memory bank, the in-memory bank being configured to hold a predefined number of stripes of the storage object in accordance with an erasure coding scheme assigned to the storage object;
   determining, by the node, whether the in-memory bank has become full; and
   in response to determining that the in-memory bank has become full:
      computing and filling one or more parity blocks for each stripe of the storage object in the in-memory bank; and
      writing, based on a next sub-segment pointer pointing to a free sub-segment of the pre-allocated segment, the contents of the in-memory bank via a full stripe write to the free sub-segment.

2. The method of claim 1 further comprising, subsequently to the writing:
   determining whether the pre-allocated segment contains any further free sub-segments; and
   if the pre-allocated segment does not contain any further free sub-segments:
      pre-allocating a new segment in the capacity object of the storage object; and
      setting the next sub-segment pointer to point to the first sub-segment of the new segment.

3. The method of claim 2 further comprising:
   if the pre-allocated segment does contain another free sub-segment, setting the next sub-segment pointer to point to said another free sub-segment.

4. The method of claim 1 wherein the metadata object is created and managed on the second storage tier using an overwrite-based file system disk layout, and wherein the capacity object is created and managed on the first storage tier using a log-structured file system (LFS) disk layout.

5. The method of claim 1 wherein the capacity object is striped across the first storage tier in accordance with the erasure coding scheme assigned to the storage object, and wherein the metadata object is mirrored across the second storage tier in a manner that enables the metadata object to achieve an equivalent level of fault tolerance as the capacity object.

6. The method of claim 1 wherein the writing of the contents of the in-memory bank to the free sub-segment does not generate any metadata I/O to the capacity object.

7. The method of claim 1 wherein a size of the pre-allocated segment is larger than a size of the in-memory bank.

8. A non-transitory computer readable storage medium having stored thereon program code executable by a node in a distributed storage system, the program code embodying a method for supporting large segments when issuing writes to an erasure coded storage object in a distributed storage system, the method comprising:
   pre-allocating a segment of space in a capacity object of the storage object, the capacity object being maintained on a first storage tier of the distributed storage system comprising a first set of one or more storage devices;
   receiving a write request for updating a logical block of the storage object;
   writing data and metadata for the logical data block to a data log record in a data log of a metadata object of the storage object, the metadata object being maintained on a second storage tier of the distributed storage system comprising a second set of one or more storage devices, the second storage tier having higher I/O performance but lower storage capacity than the first storage tier;
   placing the data for the logical data block in a free slot of an in-memory bank, the in-memory bank being configured to hold a predefined number of stripes of the storage object in accordance with an erasure coding scheme assigned to the storage object;
   determining whether the in-memory bank has become full; and
   in response to determining that the in-memory bank has become full:
      computing and filling one or more parity blocks for each stripe of the storage object in the in-memory bank; and writing, based on a next sub-segment pointer pointing to a free sub-segment of the pre-allocated segment, the contents of the in-memory bank via a full stripe write to the free sub-segment.

9. The non-transitory computer readable storage medium of claim 8 wherein the method further comprises, subsequently to the writing:

determining whether the pre-allocated segment contains any further free sub-segments; and if the pre-allocated segment does not contain any further free sub-segments:

pre-allocating a new segment in the capacity object of the storage object; and setting the next sub-segment pointer to point to the first sub-segment of the new segment.

10. The non-transitory computer readable storage medium of claim 9 wherein the method further comprises:

if the pre-allocated segment does contain another free sub-segment, setting the next sub-segment pointer to point to said another free sub-segment.

11. The non-transitory computer readable storage medium of claim 8 wherein the metadata object is created and managed on the second storage tier using an overwrite-based file system disk layout, and wherein the capacity object is created and managed on the first storage tier using a log-structured file system (LFS) disk layout.

12. The non-transitory computer readable storage medium of claim 8 wherein the capacity object is striped across the first storage tier in accordance with the erasure coding scheme assigned to the storage object, and wherein the metadata object is mirrored across the second storage tier in a manner that enables the metadata object to achieve an equivalent level of fault tolerance as the capacity object.

13. The non-transitory computer readable storage medium of claim 8 wherein the writing of the contents of the in-memory bank to the free sub-segment does not generate any metadata I/O to the capacity object.

14. The non-transitory computer readable storage medium of claim 8 wherein a size of the pre-allocated segment is larger than a size of the in-memory bank.

15. A computer system acting as a node in a distributed storage system, the computer system comprising:

a processor;

a system memory;

a first storage device that is part of a first storage tier of the distributed storage system;

a second storage device that is part of a second storage tier of the distributed storage system; and a non-transitory computer readable medium having stored thereon program code that, when executed, causes the processor to:

pre-allocate a segment of space in a capacity object of a storage object, the capacity object being maintained on the first storage tier;

receive a write request for updating a logical block of the storage object;

write data and metadata for the logical data block to a data log record in a data log of a metadata object of the storage object, the metadata object being maintained on the second storage tier, the second storage tier having higher I/O performance but lower storage capacity than the first storage tier;

place the data for the logical data block in a free slot of an in-memory bank, the in-memory bank being configured to hold a predefined number of stripes of the storage object in accordance with an erasure coding scheme assigned to the storage object;

determine whether the in-memory bank has become full; and in response to determining that the in-memory bank has become full:

compute and fill one or more parity blocks for each stripe of the storage object in the in-memory bank; and write, based on a next sub-segment pointer pointing to a free sub-segment of the pre-allocated segment, the contents of the in-memory bank via a full stripe write to the free sub-segment.

16. The computer system of claim 15 wherein the program code further causes the processor to, subsequently to the writing:

determine whether the pre-allocated segment contains any further free sub-segments; and if the pre-allocated segment does not contain any further free sub-segments:

pre-allocate a new segment in the capacity object of the storage object; and set the next sub-segment pointer to point to the first sub-segment of the new segment.

17. The computer system of claim 16 wherein the program code further causes the processor to:

if the pre-allocated segment does contain another free sub-segment, set the next sub-segment pointer to point to said another free sub-segment.

18. The computer system of claim 15 wherein the metadata object is created and managed on the second storage tier using a overwrite-based file system disk layout, and wherein the capacity object is created and managed on the first storage tier using a log-structured file system (LFS) disk layout.

19. The computer system of claim 15 wherein the capacity object is striped across the first storage tier in accordance with the erasure coding scheme assigned to the storage object, and wherein the metadata object is mirrored across the second storage tier in a manner that enables the metadata object to achieve an equivalent level of fault tolerance as the capacity object.

20. The computer system of claim 15 wherein the writing of the contents of the in-memory bank to the free sub-segment does not generate any metadata I/O to the capacity object.

21. The computer system of claim 15 wherein a size of the pre-allocated segment is larger than a size of the in-memory bank.

* * * * *